US012057077B2

(12) United States Patent
Eun et al.

(10) Patent No.: US 12,057,077 B2
(45) Date of Patent: Aug. 6, 2024

(54) DISPLAY PANEL, DISPLAY DEVICE AND DATA DRIVER CIRCUIT

(71) Applicant: LG DISPLAY CO., LTD., Seoul (KR)

(72) Inventors: Juhee Eun, Seoul (KR); ByungJae Lim, Gyeonggi-do (KR); Byoung-Wook Kang, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/958,472

(22) Filed: Oct. 3, 2022

(65) Prior Publication Data

US 2023/0169928 A1 Jun. 1, 2023

(30) Foreign Application Priority Data

Dec. 1, 2021 (KR) ........................ 10-2021-0169824

(51) Int. Cl.
*G09G 3/3291* (2016.01)
*G09G 3/3233* (2016.01)

(52) U.S. Cl.
CPC ..... *G09G 3/3291* (2013.01); *G09G 2330/021* (2013.01); *G09G 2340/0435* (2013.01)

(58) Field of Classification Search
CPC .............................................. G09G 2340/0435
See application file for complete search history.

(56) References Cited

U.S. PATENT DOCUMENTS 11,170,692 B1 * 11/2021 Orio ..................... G09G 3/2022
2003/0020699 A1 * 1/2003 Nakatani .............. G09G 3/3611 345/204
2007/0200838 A1 * 8/2007 Lee .......................... G09G 5/12 345/204
2015/0287352 A1 * 10/2015 Watanabe ............ G09G 3/3648 345/89
2016/0125785 A1 * 5/2016 Wang ..................... G09G 5/391 345/582
2017/0200407 A1 * 7/2017 Nakao .................. G09G 3/3688
2018/0024386 A1 * 1/2018 Kim ..................... G09G 3/3655 349/36
2018/0033378 A1 * 2/2018 Li ........................ G09G 3/3406
2019/0057646 A1 * 2/2019 Lin ...................... G09G 3/3233
2019/0310502 A1 * 10/2019 Chida ................... G02F 1/1368
2020/0092516 A1 * 3/2020 Moon ................... G06F 1/3215
2020/0211475 A1 * 7/2020 Park ..................... G09G 3/3275
2020/0226978 A1 * 7/2020 Lin ...................... G09G 3/3233
2021/0012711 A1 * 1/2021 Huang ................. G09G 3/3291
2021/0248957 A1 * 8/2021 Lee ...................... G09G 3/3225
2022/0059033 A1 * 2/2022 Seki ..................... G09G 3/3258
2022/0068220 A1 * 3/2022 Kim ..................... G09G 3/3233
2022/0189363 A1 * 6/2022 Jung ........................ G09G 3/20
2022/0319435 A1 * 10/2022 Park ..................... G09G 3/3266
(Continued)

*Primary Examiner* — Sepehr Azari
(74) *Attorney, Agent, or Firm* — POLSINELLI PC

(57) ABSTRACT

A display panel includes a plurality of subpixels and a plurality of data lines electrically connected to the plurality of subpixels, and a data driver circuit applies data voltages for outputting images to the plurality of data lines in a refresh frame period, wherein the data driver circuit applies a data voltage for outputting a first image to the plurality of data lines at a first driving frequency, and applies a data voltage for outputting a second image different from the first image to the plurality of data lines at a second driving frequency higher than the first driving frequency.

17 Claims, 17 Drawing Sheets

(56) References Cited

U.S. PATENT DOCUMENTS

2022/0358897 A1* 11/2022 Sato .......................... G09G 5/10
2023/0178050 A1* 6/2023 Lee .......................... G06F 3/041
345/213

* cited by examiner

<LUT>

| SET | Refresh Rate | LRR (A) | MRR (B) |
|---|---|---|---|
| Set 0 | 120 Hz | – | – |
| Set 1 | 60 Hz | – | – |
| Set 2 | 30 Hz | – | – |
| Set 3 | 10 Hz | 10 Hz | Set 1 |
| Set 4 | 1 Hz | 1 Hz | Set 0 |

DISPLAY PANEL, DISPLAY DEVICE AND DATA DRIVER CIRCUIT

CROSS-REFERENCE TO RELATED APPLICATION

This application claims priority from Korean Patent Application No. 10-2021-0169824, filed on Dec. 1, 2021, which is hereby incorporated by reference in its entirety.

BACKGROUND

Field of the Disclosure

The present disclosure relates to a display device and a data driver circuit.

Description of the Background

In response to the development of the information society, demand for various types of display devices, such as a liquid crystal display (LCD) device and organic light-emitting display device, is increasing.

For such display devices, an approach for improving power efficiency while displaying various types of images is required.

As a method for improving the power efficiency of a display device, the display device may be operated in a low power mode.

While the display device is operating in a low power mode, the display device may intermittently apply a data voltage for displaying an image to a display panel. However, due to the long interval between time periods in each of which data voltages for a display image are applied, the response time may be delayed before complete conversion of frames. Consequently, an after image of a previous frame may be visually recognized by a user of the display device.

SUMMARY

Accordingly, the present disclosure is to provide a display device and a data driver circuit in which an after image is not visible in a low power mode.

The present disclosure is also to provide are a display device and a data driver circuit that can operate at 1 Hz in a low power mode.

In an aspect of the present disclosure, a display device includes a display panel including a plurality of subpixels and a plurality of data lines electrically connected to the plurality of subpixels, and a data driver circuit to apply data voltages for outputting images to the plurality of data lines in a refresh frame period, wherein the data driver circuit applies a data voltage for outputting a first image to the plurality of data lines at a first driving frequency, and applies a data voltage for outputting a second image different from the first image to the plurality of data lines at a second driving frequency higher than the first driving frequency.

In another aspect of the present disclosure, a data driver circuit includes image data input pins through which image data is input; a first output circuit to generate and output data voltages for outputting images on basis of the image data input through the image data input pins; a mode control signal input pin through which a mode control signal for changing an operation cycle of the first output circuit is input, and a sub-controller to reduce the operation cycle of the first output circuit on basis of the image data input through the image data input pins.

According to various aspects of the present disclosure, the display device and the data driver circuit can prevent an after image from being visible in the low power mode.

According to various aspects of the present disclosure, the display device and the data driver circuit can operate at 1 Hz in the low power mode.

BRIEF DESCRIPTION OF THE DRAWINGS

The above and other features and advantages of the present disclosure will be more clearly understood from the following detailed description, taken in conjunction with the accompanying drawings, in which.

DETAILED DESCRIPTION

Figure 1:
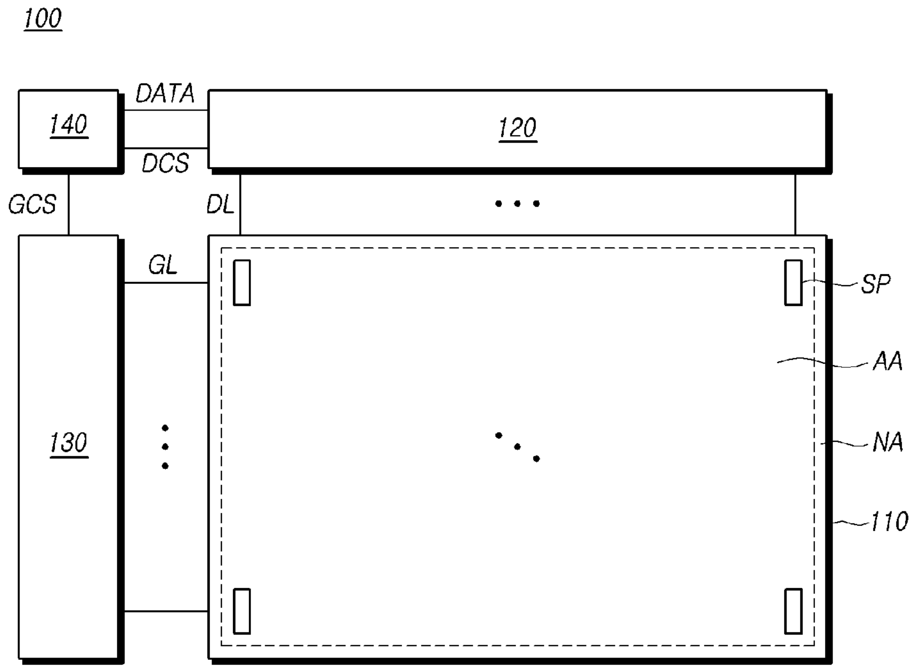
FIG. 1 is a schematic diagram illustrating a display device according to the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting", "made up of", and "formed of" used herein are generally intended to allow other components to be added unless the terms are used with the term "only". As used herein, singular forms are intended to include plural forms unless the context clearly indicates otherwise.

Terms such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps", etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a variety of aspects of the present disclosure will be described in detail with reference to the accompanying drawings.

FIG. 1 is a schematic diagram illustrating a display device 100 according to aspects.

Referring to FIG. 1, a display device 100 according to aspects may include a display panel 110, a data driver circuit 120 and a gate driver circuit 130 driving the display panel 110, and a controller 140 controlling the data driver circuit 120 and the gate driver circuit 130.

The display panel 110 may include signal lines, such as a plurality of data lines DL and a plurality of gate lines GL, disposed on a substrate. The display panel 110 may also include a plurality of subpixels SP electrically connected to the plurality of data lines DL and the plurality of gate lines GL.

The display panel 110 may include an active area (or display area) AA on which images are displayed and a non-active area (or non-display area) NA on which images are not displayed. In the display panel 110, the plurality of subpixels SP for displaying images may be disposed in the active area AA. In the non-active area NA, the data driver circuit 120 and the gate driver circuit 130 may be disposed, or a pad part connected to the data driver circuit 120 or the gate driver circuit 130 may be disposed.

The data driver circuit 120 is a circuit configured to drive the plurality of data lines DL. The data driver circuit 120 may apply data voltages to the plurality of data lines DL. The gate driver circuit 130 is a circuit configured to drive the plurality of gate lines. The gate driver circuit 130 may transfer gate signals to the plurality of gate lines GL. The controller 140 may transfer data drive timing control signals DCS to the data driver circuit 120 to control the operation timing of the data driver circuit 120. The controller 140 may transfer gate drive timing control signals GCS to the gate driver circuit 130 to control the operation timing of the gate driver circuit 130.

The controller 140 may start scanning at points in time defined for respective frames, convert image data input from an external source into image data DATA having a data signal format readable by the data driver circuit 120, provide the image data DATA to the data driver circuit 120, and control data driving at appropriate points in time in response to the scanning.

The controller 140 may receive a variety of timing signals together with the input image data from an external source (e.g., a host system). For example, the timing signals may include a vertical synchronization signal Vsync, a horizontal synchronization signal Hsync, an input data enable (DE) signal, a clock (CLK) signal, and the like.

The controller 140 may receive timing signals, such as a vertical synchronization signal Vsync, a horizontal synchronization signal Hsync, an input data enable (DE) signal, and a clock (CLK) signal, generate a variety of control signals DCS and GCS, and output the control signals DCS or GCS to the data driver circuit 120 and the gate driver circuit 130 in order to control the data driver circuit 120 and the gate driver circuit 130.

The controller 140 outputs a variety of gate drive timing control signals GCS including a gate start pulse (GSP), a gate shift clock (GSC), a gate output enable (GOE) signal, and the like in order to control the gate driver circuit 130.

The controller 140 outputs a variety of data drive timing control signals DCS including a source start pulse (SSP), a source sampling clock (SSC), and the like in order to control the data driver circuit 120.

The data driver circuit 120 drives the plurality of data lines DL by receiving image data DATA from the controller 140.

The data driver circuit 120 may include one or more source driver integrated circuits (SDICs).

Each of the SDICs may be connected to the display panel 110 by a tape-automated bonding (TAB) method, connected to a bonding pad of the display panel 110 by a chip-on-glass (COG) method, or implemented using a chip-on-film (COF) structure connected to the display panel 110.

The gate driver circuit 130 may output a gate signal having a turn-on level voltage or a gate signal having a turn-off level voltage under the control of the controller 140. The gate driver circuit 130 may sequentially drive the plurality of gate lines GL by sequentially transferring the gate signal having a turn-on level voltage to the plurality of gate lines GL.

The gate driver circuit 130 may be connected to the display panel 110 by a TAB method, connected to a bonding pad of the display panel 110 by a COG method or a COP method, or connected to the display panel 110 by a COF method.

The gate driver circuit 130 may be formed in the non-active area NA of the display panel 110 by a gate-in-panel method (GIP). The gate driver circuit 130 may be disposed on a substrate of the display panel 110 or connected to the substrate. That is, when the gate driver circuit 130 is a GIP type, the gate driver circuit 130 may be disposed in the non-active area NA of the substrate. When the gate driver circuit 130 is a COG type or a COF type, the gate driver circuit 130 may be connected to the substrate of the display panel 110.

When a specific gate line among the plurality of gate lines GL is opened by the gate driver circuit 130, the data driver circuit 120 may convert the image data DATA received from the controller 140 into an analog data voltage and apply the analog data voltage to the plurality of data lines DL.

The data driver circuit 120 may be connected to one side (e.g., a top side or a bottom side) of the display panel 110. The data driver circuit 120 may be connected to both sides (e.g., both the top side and the bottom side) of the display panel 110 or connected to 2 or more sides among 4 sides of the of the display panel 110, depending on the driving method, the design of the display panel, or the like.

The gate driver circuit 130 may be connected to one side (e.g., a left side or a right side) of the display panel 110. The gate driver circuit 130 may be connected to both sides (e.g., both the left side and the right side) of the display panel 110 or connected to 2 or more sides among 4 sides of the of the display panel 110, depending on the driving method, the design of the display panel, or the like.

The controller 140 may be a timing controller used in typical display field, may be a control device including a timing controller and able to perform other control functions, may be a control device different from the timing controller, or may be a circuit in a control device. The controller 140 may be implemented as a variety of circuits or electronic components, such as an integrated circuit (IC), a field programmable gate array (FPGA), an application specific integrated circuit (ASIC), a processor, or the like.

The controller 140 may be mounted on a printed circuit board (PCB), a flexible printed circuit (FPC), or the like, and electrically connected to the data driver circuit 120 and the gate driver circuit 130 through the PCB, the FPC, or the like.

The controller 140 may transmit signals to or receive signals from the data driver circuit 120 through at least one predetermined interface. Here, for example, the interface may include a low-voltage differential signaling (LVDS) interface, an embedded point-to-point interface (EPI), a serial peripheral interface (SPI), and the like.

The controller 140 may include a storage medium, such as at least one register.

The display device 100 according to aspects may be a display, such as a liquid crystal display device, including a backlight unit or may be a self-emissive display, such as an organic light-emitting display, a quantum dot display, or a micro light-emitting diode (LED) display.

When the display device 100 according to aspects is an organic light-emitting display, each of the subpixels SP may include a self-emissive organic light-emitting diode as an emitting element. When the display device 100 is a quantum dot display, each of the subpixels SP may include an emitting device implemented as a quantum dot that is a self-emissive semiconductor crystal. When the display device 100 according to aspects is a micro LED display, each of the subpixels SP may include, as an emitting device, a self-emissive micro LED based on an inorganic material. Hereinafter, for the sake of brevity, the display device 100 according to aspects will be described as being an organic light-emitting display, and the present disclosure is not limited to the organic light-emitting display.

Figure 2:
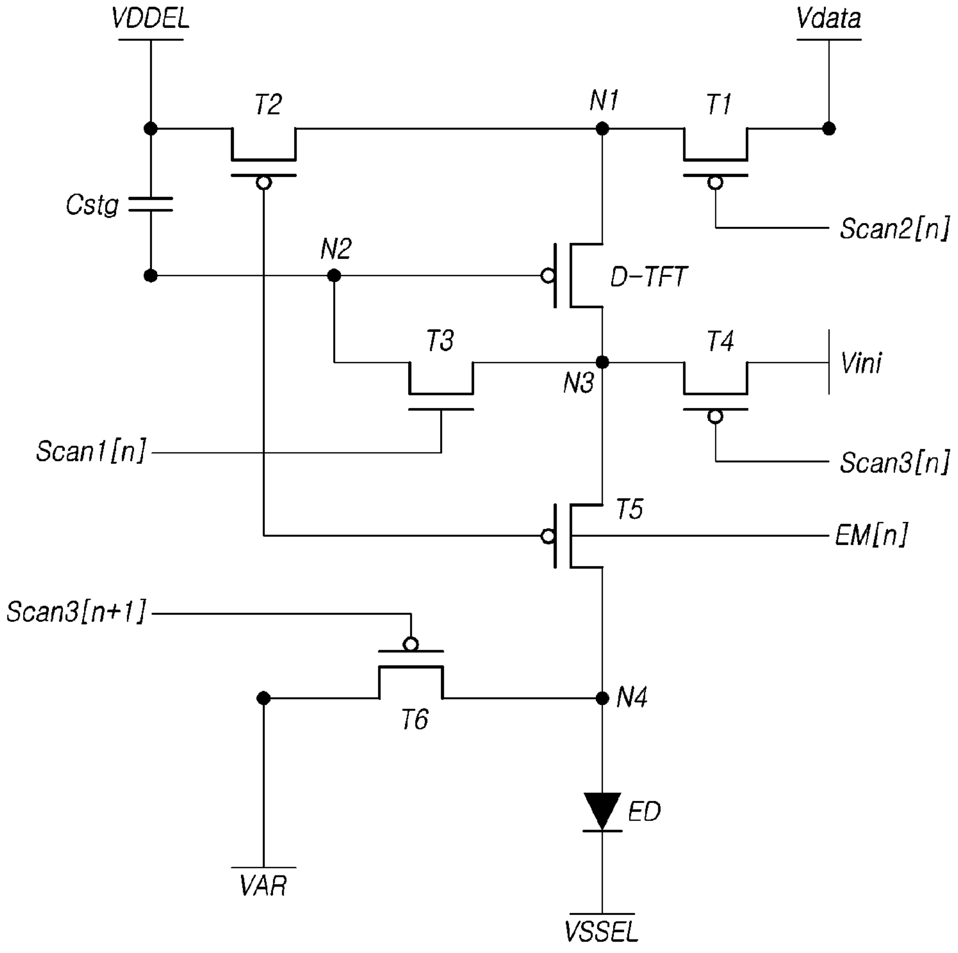
FIG. 2 is a circuit diagram illustrating an example of the subpixel of the display device according to the present disclosure.

FIG. 2 is a circuit diagram illustrating a subpixel SP of the display device 100 according to aspects.

Referring to FIG. 2, the subpixel SP may include an organic light-emitting diode ED and a driving transistor D-TFT configured to drive the organic light-emitting diode ED.

The subpixel SP may further include at least one transistor, in addition to the driving transistor D-TFT. Each subpixel SP may include at least one oxide semiconductor transistor (e.g., oxide TFT).

The subpixel SP may include first to sixth transistors T1 to T6 in addition to the driving transistor D-TFT. Each of the transistors may be a P-type transistor or an N-type transistor.

The N-type transistor may be implemented as an oxide transistor (e.g., a transistor having a channel formed from a semiconducting oxide, such as In oxide, Ga oxide, a Zn oxide, or indium gallium zinc oxide (IGZO)) formed from a semiconducting oxide. The P-type transistor may be a Si transistor (e.g., a transistor having a poly-Si channel referred to as a low-temperature poly-Si (LTPS) formed using a low temperature process) formed from a semiconductor, such as Si.

The oxide transistor is characterized in that the leakage current thereof is lower than that of the Si transistor.

The subpixel SP may further include a storage capacitor Cstg configured to apply a voltage corresponding to a data voltage Vdata to a gate node of the driving transistor D-TFT during a one-frame period.

The structure of the subpixel SP including 7 transistors and 1 capacitor will also be referred to as a 7T1C structure.

Hereinafter, for the sake of brevity, the subpixel SP in the display device 100 according to aspects will be described as having the 7T1C structure. However, the structure of the subpixel SP in the display device 100 according to aspects is not limited to the 7T1C structure, and the subpixel SP may further include at least one circuit device. The subpixel SP may have a 2T1C structure comprised of 2 transistors and 1 capacitor. The subpixel SP may further include at least one transistor or at least one capacitor.

The first transistor T1 may be configured to switch an electrical connection between a first node N1 of the driving transistor D-TFT and a data line DL. The first node N1 of the driving transistor D-TFT may be a source node or a drain node of the driving transistor D-TFT. The operation timing of the first transistor T1 may be controlled by a second scan signal Scan2[*n*]. When the second scan signal Scan2[*n*] having a turn-on level voltage is applied to the first transistor T1, a data voltage Vdata is applied to the first node N1 of the driving transistor D-TFT.

The second transistor T2 may be configured to switch an electrical connection between the first node N1 of the driving transistor D-TFT and a high potential driving voltage (VDDEL) line. The operation timing of the second transistor T2 may be controlled by an emission signal EM. When an emission signal EM[*n*] having a turn-on level voltage is applied to the second transistor T2, a high potential driving voltage VDDEL is applied to the first node N1 of the driving transistor D-TFT.

The storage capacitor Cstg may include one end electrically connected to a second node N2 of the driving transistor D-TFT and the other end electrically connected to the high potential driving voltage (VDDEL) line. The second node N2 of the driving transistor D-TFT may be a gate node of the driving transistor D-TFT.

The third transistor T3 is electrically connected to the second node N2 and a third node N3 of the driving transistor D-TFT. The operation timing of the third transistor T3 may be controlled by a first scan signal Scan1 [*n*]. The third node N3 of the driving transistor D-TFT may be the drain node or the source node of the driving transistor D-TFT.

The third transistor T3 may be an oxide transistor. Since the oxide transistor has a low leakage current characteristic, the voltage level of the second node N2 of the driving transistor D-TFT may be maintained constant. Thus, even in the case in which the image-displaying data voltage Vdata is not applied for every frame, the subpixel SP may display an image on the screen on the basis of the image-displaying data voltage Vdata input in a previous frame.

The fourth transistor T4 may be configured to switch an electrical connection between the third node N3 of the driving transistor D-TFT and an initialization voltage (Vini) line. The fourth transistor T4 may be controlled by a third scan signal Scan3[*n*]. When the third scan signal Scan3 [*n*] having a turn-on level voltage is applied, the initialization voltage Vini is applied to the third node N3 of the driving transistor D-TFT.

The fifth transistor T5 may be configured to switch an electrical connection between the third node N3 of the driving transistor D-TFT and a first electrode of an emitting device ED. The fifth transistor T5 includes a fourth node N4, and the fourth node N4 of the fifth transistor T5 is electrically connected to the first electrode of the emitting device ED. The fourth node N4 of the fifth transistor T5 may be a source node or a drain node of the fifth transistor T5. The first electrode of the emitting device ED may be an anode or a cathode. Hereinafter, the first electrode of the emitting device ED will be described as the anode.

The operation timing of the fifth transistor T5 is controlled by the emission signal EM[*n*]. The emission signal EM[*n*] controlling the operation timing of the fifth transistor T5 may be the same as the emission signal EM[*n*] controlling the operation timing of the second transistor T2. The gate node of the fifth transistor T5 and the gate node of the second transistor T2 may be electrically connected to a single emission signal EM[*n*] line.

The sixth transistor T6 may be configured to switch an electrical connection between the first electrode of the emitting device ED and a reset voltage (VAR) line. When the first electrode of the emitting device ED is an anode, the reset voltage VAR may be an anode reset voltage VAR.

The operation timing of the sixth transistor T6 may be controlled by a third scan signal Scan3[*n*+1]. The third scan signal Scan3[*n*+1] controlling the operation timing of the sixth transistor T6 may be the same signal as the third scan signal Scan3 [*n*] controlling the operation timing of the fourth transistor T4 of another subpixel SP.

For example, the third scan signal Scan3[*n*+1] may be applied to the sixth transistor T6 included in a subpixel SP electrically connected to nth gate line (where n is an integer equal to or greater than 1). The third scan signal Scan3[*n*+1] applied to the subpixel SP may the same signal as the third scan signal Scan3[*n*+1] applied to the fourth transistor T4 included in a subpixel SP positioned on an (n+1)th gate line.

The first electrode of the organic light-emitting diode ED is electrically connected to the fourth node N4 of the fifth transistor T5. The second electrode of the organic light-emitting diode ED is electrically connected to a low potential driving voltage (VSSEL) line. The first electrode of the organic light-emitting diode ED may be an anode or a cathode. The second electrode of the organic light-emitting diode ED may be a cathode or an anode.

The high potential driving voltage (VDDEL) line and the low potential driving voltage (VSSEL) line may be common voltage lines connected in common to the plurality of subpixels SP disposed in the display panel 110.

Referring to FIG. 2, the third transistor T3 may be an N-type transistor, whereas the remaining transistors may be P-type transistors. Although the driving transistor D-TFT, the first transistor T1, the second transistor T2, the fourth transistor T4, the fifth transistor T5, and the sixth transistor T6 may be P-type transistors, at least one of these transistors may be an N-type transistor.

Figure 3:
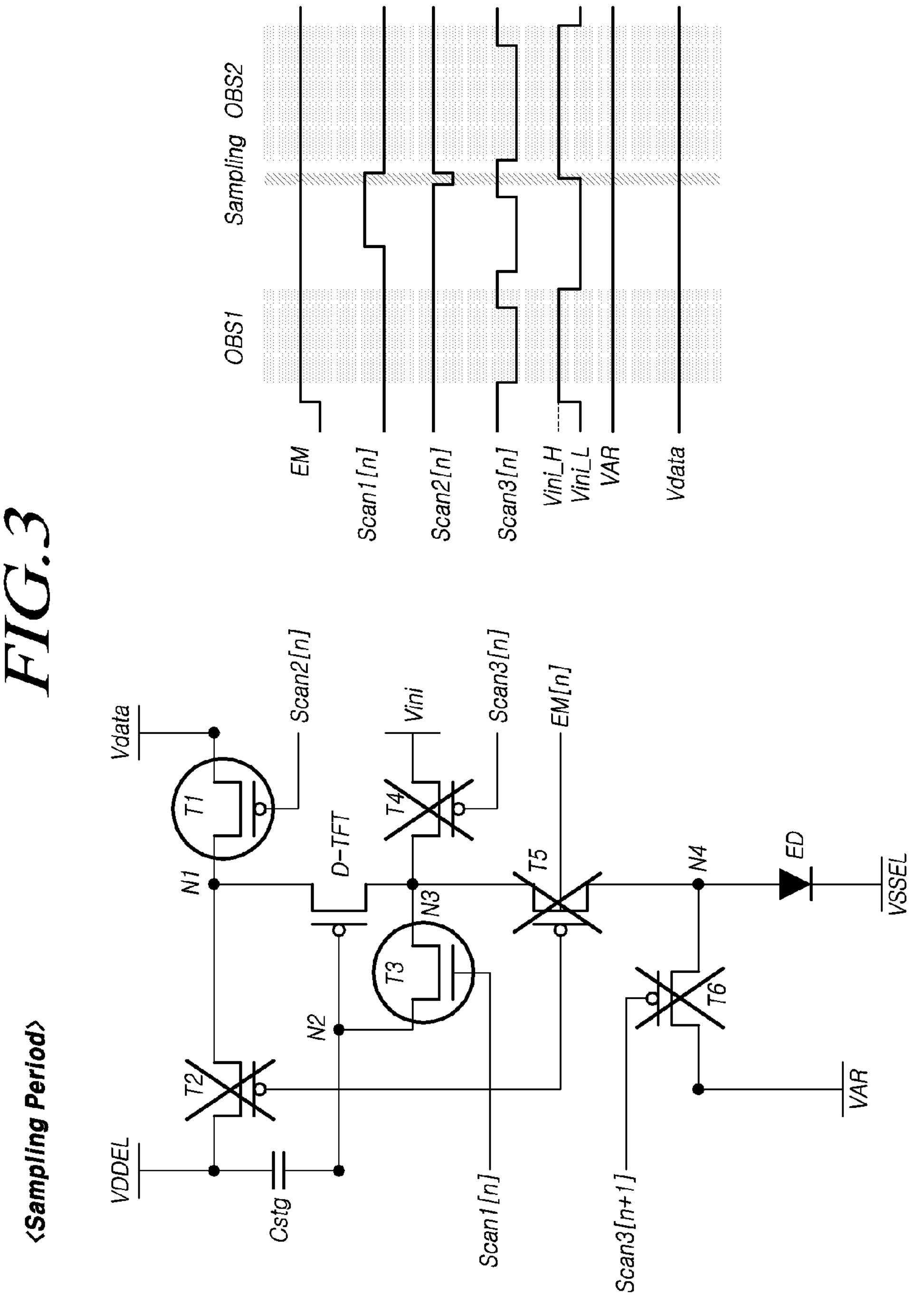
FIG. 3 illustrates a sampling period in the display device according to the present disclosure.

FIG. 3 illustrates a sampling period in the display device according to aspects.

In FIG. 3, a timing diagram illustrating a refresh frame period in which an data voltage Vdata for displaying an image is applied to a subpixel SP is depicted.

A refresh frame may have a first on-bias period OBS1 and a second on-bias period OBS2 configured to apply an initialization voltage Vini_H having a high level voltage to the third node N3 of the driving transistor D-TFT and a sampling period configured to apply a voltage corresponding to the data voltage Vdata to the second node N2 of the driving transistor D-TFT.

The on-bias periods OBS1 and OBS2 may be periods configured to alleviate the hysteresis effect that may occur in the driving transistor D-TFT and improve response characteristics.

During the sampling period, an emission signal EM[*n*] having a turn-off level voltage is applied to the second transistor T2 and the fifth transistor T5. A first scan signal Scan1[*n*] having a turn-on level voltage is applied to the third transistor T3. A second scan signal Scan2[*n*] having a turn-on level voltage is applied to the first transistor T1. Third scan signals Scan3[*n*] and Scan3[*n*+1] having a turn-off level voltage are applied to the fourth transistor T4 and the sixth transistor T6, respectively.

When entering the sampling period, an initialization voltage Vini_L having a low level is applied to the third node N3 of the driving transistor D-TFT. When the third transistor T3 is turned on, the third node N3 and the second node N2 of the driving transistor D-TFT are electrically connected, and a turn-on level voltage is applied to the second node N2 of the driving transistor D-TFT.

When the driving transistor D-TFT, the first transistor T1, and the third transistor T3 are turned on in the sampling period, a voltage corresponding to the data voltage Vdata is applied to the second node N2 of the transistor D-TFT. Thus, the voltage corresponding to the data voltage Vdata is applied to one end of the storage capacitor Cstg.

Figure 4:
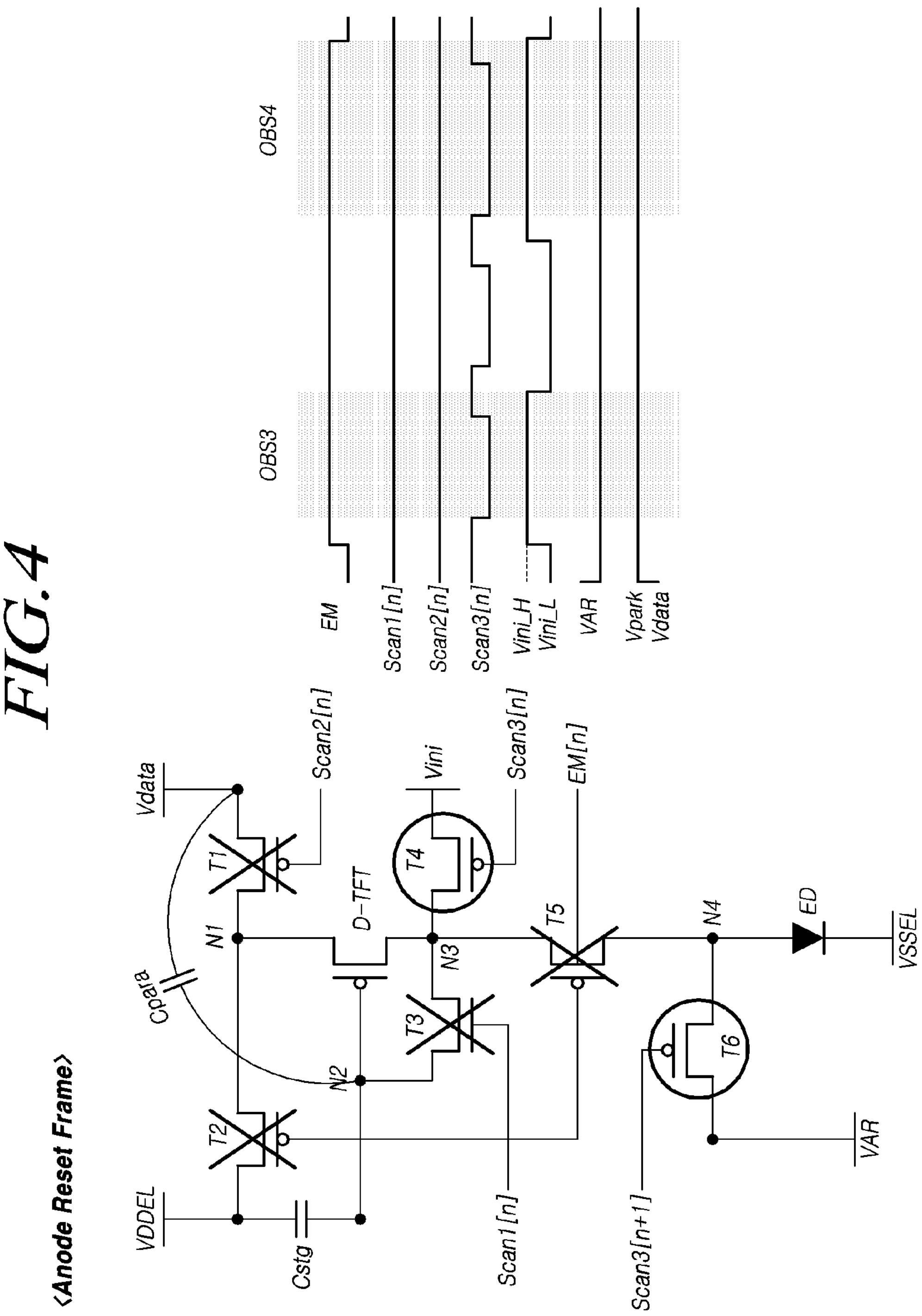
FIG. 4 illustrates an anode reset frame in the display device according to the present disclosure.

FIG. 4 illustrates an anode reset frame in the display device according to aspects.

Referring to FIG. 4, an emission signal EM[*n*] having a turn-off level voltage is applied to the second transistor T2 and the fifth transistor T5. A first scan signal Scan1[*n*] having a turn-off level voltage is applied to the third transistor T3. A second scan signal Scan2[*n*] having a turn-off level voltage is applied to the first transistor T1. Third scan signals Scan3[*n*] and Scan3[*n*+1] are applied to the fourth transistor T4 and the sixth transistor T6, respectively. In the third scan signals Scan3[*n*] and Scan3[*n*+1], the turn-on level voltage and the turn-off level voltage may alternate with each other during an anode reset frame period.

When the third scan signal Scan3 [*n*] is a turn-on level voltage signal, the fourth transistor T4 is turned on. A high level initialization voltage Vini_H is applied to the third node N3 of the driving transistor D-TFT.

During the anode reset frame period, the high level initialization voltage Vini_H may be applied to the third node N3 of the driving transistor D-TFT. The corresponding period may be comprised of a third on-bias period OBS3 and a fourth on-bias period OBS4.

When the third scan signal Scan3[$n$+1] is a turn-on level voltage signal, the sixth transistor T6 is turned on. An anode reset voltage VAR is applied to the first electrode of the organic light-emitting diode ED.

The voltage level of the anode reset voltage VAR applied to the first electrode of the organic light-emitting diode ED during the anode reset frame period may be different from the voltage level of the anode reset voltage VAR applied to the first electrode of the organic light-emitting diode ED during the refresh frame period. When the voltages applied to the first electrode of the organic light-emitting diode ED during the above-described two periods have different levels, the anode reset voltage VAR during the refresh frame period will be referred to as a VAR_A voltage and the anode reset voltage VAR during the anode reset frame period will be referred to as a VAR_B voltage in order to distinguish the two voltages. This anode reset frame is also referred to as a "skip frame".

In addition, referring to FIG. 4, the data voltage Vdata having a preset voltage level is applied to a data line DL during the anode reset frame period.

A parasitic capacitance Cpara may be formed between the second node N2 of the driving transistor D-TFT and the data line DL through which the data voltage Vdata is applied to the corresponding driving transistor D-TFT. In some cases, a physical capacitor device having one end electrically connected to a corresponding data line DL and the other end electrically connected to the second node N2 of the driving transistor D-TFT may be provided. Hereinafter, a situation in which the parasitic capacitance Cpara is formed between the second node N2 of the driving transistor D-TFT and the data line DL will be described as an example.

Since the parasitic capacitance Cpara is formed between the second node N2 of the driving transistor D-TFT and the data line DL during the anode reset frame period, a change in the voltage level on the second node N2 of the driving transistor D-TFT due to the application of a voltage having a preset level to the data line DL may be prevented.

The data signal applied to the data line DL to prevent the voltage level on the second node N2 of the driving transistor D-TFT from changing during the anode reset frame period is referred to as a "park voltage Vpark". The voltage level of the park voltage Vpark may be the same as or similar to the voltage level of the data signal Vdata for displaying a black grayscale image or a low grayscale image.

Changes in the voltage on the second node N2 of the driving transistor D-TFT are reduced during the anode reset frame period. That is, the level of the voltage applied to the second node N2 of the driving transistor D-TFT during the anode reset frame period may be the same as or similar to the voltage level in the previous sampling period.

Figure 5:
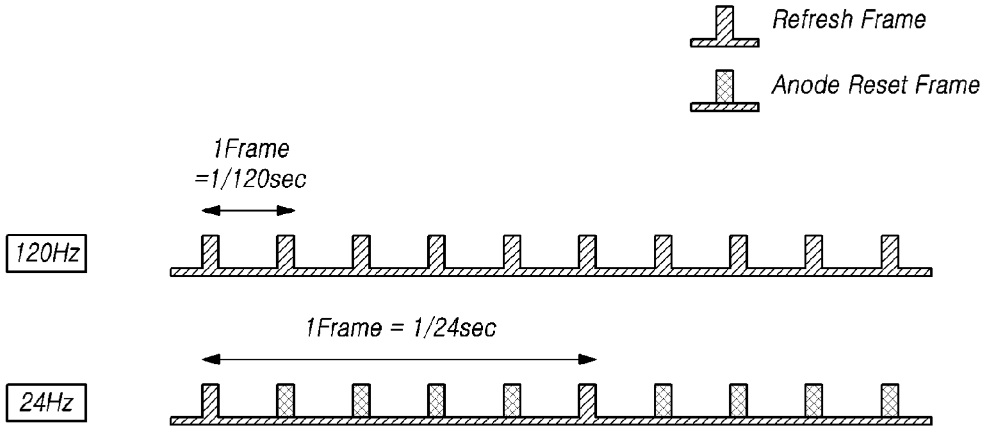
FIG. 5 illustrates examples of a high speed driving operation and a low speed driving operation in the display device operates at a low driving frequency according to the present disclosure.

FIG. 5 illustrates a driving frequency in the display device 100 according to aspects.

Referring to FIG. 5, the display device 100 according to aspects may perform "high speed driving operation" in which all frames are refresh frames. In addition, the display device according to aspects may perform "intermediate speed driving operation" or "low speed driving operation" in which at least one anode reset frame is present between different refresh frames.

Meanwhile, herein, the term "driving frequency" is defined. The driving frequency is defined as the number of refresh frames output by the display device 100 for 1 second.

Referring to FIG. 5, the display device 100 according to aspects may output 120 refresh frames for 1 second. In this case, the driving frequency of the display device 100 is defined as 120 Hz.

Referring to FIG. 5, the display device 100 according to aspects may output 24 refresh frames for 1 second. In this case, the driving frequency of the display device 100 is defined as 24 Hz.

When the display device 100 according to aspects operates at a driving frequency of 120 Hz in the high speed driving operation, all 120 frames displayed in the active area for 1 second are refresh frames.

When the display device operates at a driving frequency of 24 Hz, 24 frames among 120 frames displayed for 1 second are refresh frames and the remaining 96 frames are anode reset frames. That is, after 1 refresh frame is output, 4 anode reset frames may be output consecutively.

Thus, the display device 100 according to aspects may operate at various driving frequencies, i.e., various driving modes from the high speed driving operation to the low speed driving operation.

Figure 6:
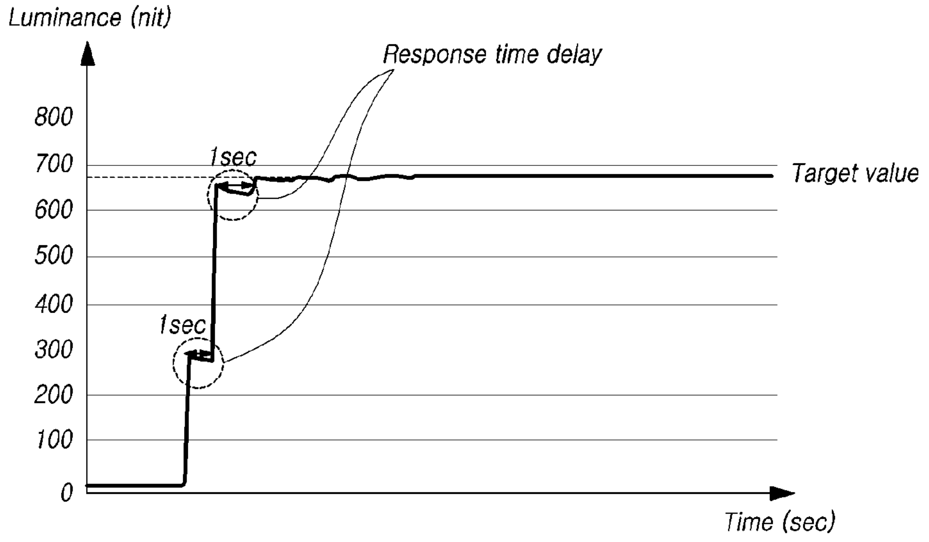
FIG. 6 illustrates response time delays in frame switching when the display device operates at a low driving frequency according to the present disclosure.

FIG. 6 illustrates response time delay in frame switching when the display device 100 according to aspects operates at a low driving frequency.

Referring to FIG. 6, the display device 100 according to aspects may perform low speed driving operation.

The low speed driving operation may be, for example, a situation in which the display device 100 operates in a low power mode. The low power mode may be, for example, an always-on-display (AoD) mode.

As described above with reference to FIG. 4, during the anode reset frame period, the data driver circuit 120 applies a park voltage Vpark having a preset level to the data lines DL. Thus, during the anode reset frame period, the data driver circuit 120 may not apply the data voltage Vdata having a different level according to the grayscale of the image data DATA.

Thus, the data driver circuit 120 may only drive a circuit configured to output the park voltage Vpark having a preset level during the anode reset frame period. Consequently, the consumption of power by the data driver circuit 120 may be significantly reduced. In the same manner, the consumption of power by the display device 100 may be reduced by reducing the driving frequency.

Referring to FIG. 6, the display device 100 according to aspects may display images at a driving frequency of about 1 Hz in the low power mode, such as the always-on-display (AoD) mode. For example, the display device 100 may consecutively output 119 anode reset frames after having output 1 refresh frame.

While the display device 100 is operating at a low speed, images displayed in the display area may be converted.

For example, while the display device 100 is operating at a low speed, the display device 100 may display a first image having a black grayscale (i.e., 0 gray) and then display a second image having a white grayscale (i.e., 255 gray).

Referring to FIG. 6, the display device 100 may need about 2 to 3 refresh frames for conversion from the black grayscale (i.e., 0 gray) to the white grayscale i.e., 255 gray).

While the display device 100 is operating at a low speed, for example, 1 Hz, the time interval between refresh frames is 1 second.

An afterimage of the first image having the black grayscale (i.e., 0 gray) remains for about 2 to 3 seconds so as to be visually recognizable to a user of the display device 100.

A phenomenon in which the afterimage of the first image is visually recognized even in the case in which the image displayed by the display device 100 is converted from the first image to the second image is referred to as a "response time delay". This is also referred to as a "response delay".

The greater the difference in the grayscale between the first image before the image conversion and the second image after the image conversion, the greater the response time delay is. The smaller the driving frequency, the greater the response time delay is.

Figure 7A:
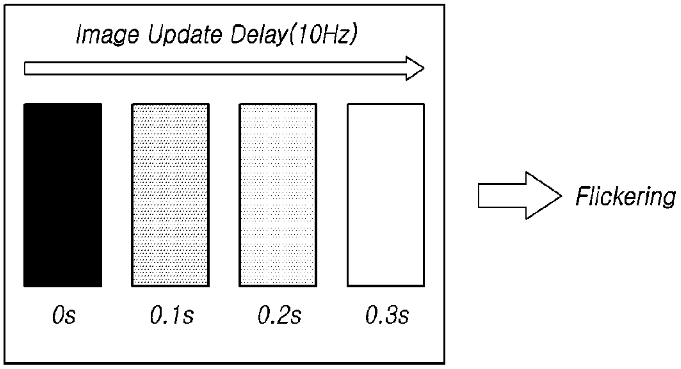
FIGS. 7A and 7B illustrate response time delay in the low speed driving operation of the display device operates at a low speed according to the present disclosure.
Figure 7B:
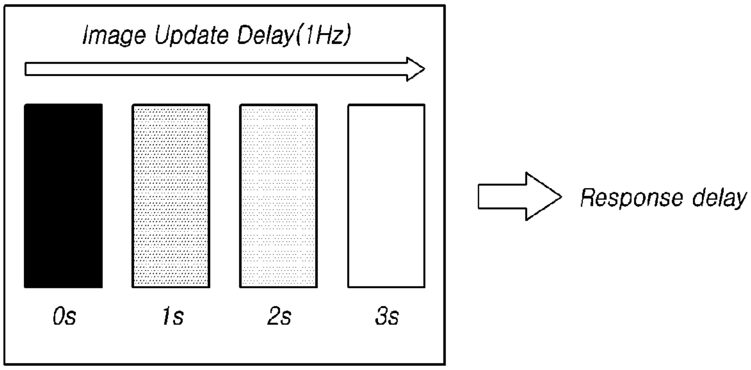

FIGS. 7A and 7B illustrate response time delay in the low speed driving operation of the display device 100 according to aspects operates.

Referring to FIG. 7A, when the display device 100 according to aspects operates at a low speed, for example, at a driving frequency of 10 Hz, a response delay of 0.2 to 0.3 second may occur.

Thus, flickering may be visually recognized between the first image having a black grayscale and the second image having a white grayscale.

Referring to FIG. 7B, when the display device 100 according to aspects operates at a low speed, for example, at a driving frequency of 1 Hz, a response delay of 2 to 3 seconds may occur.

Thus, the second image may not be displayed at normal timing, and the first image may remain as an afterimage.

Flickering, an afterimage, or the like that would occur due to the response time delay may be a cause by which the display quality is lowered.

Consequently, there is a demand to provide the display device 100 with a configuration that overcomes the problem of the response time delay while providing the display device 100 with ability to perform low speed driving operation.

Figure 8:
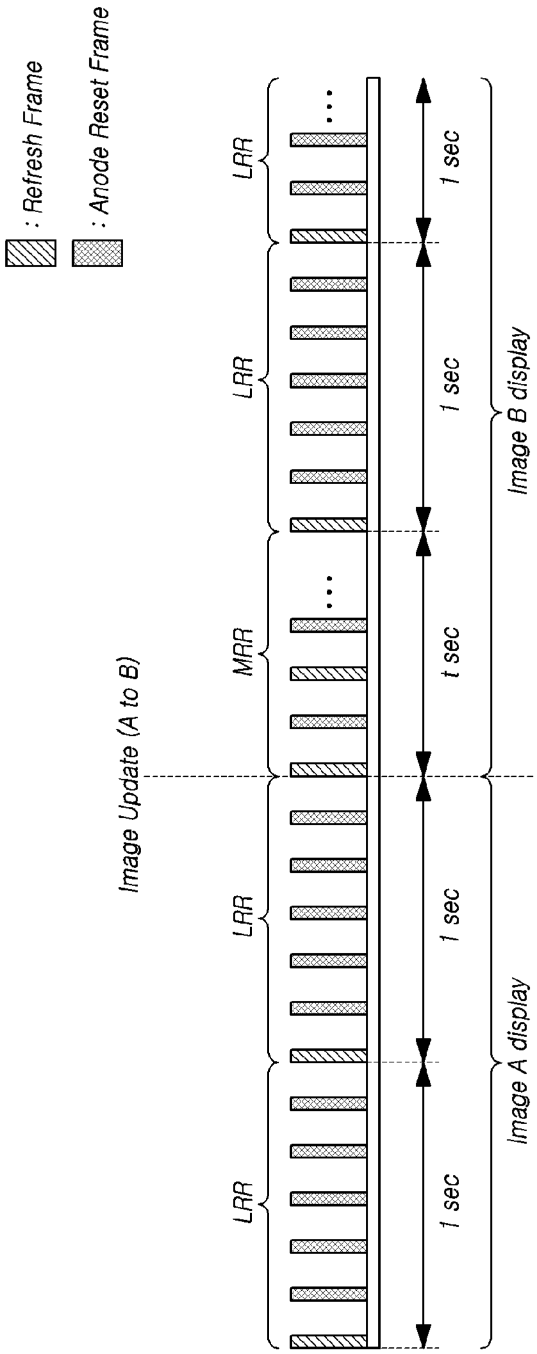
FIG. 8 illustrates the display device displays a first image at a first driving frequency and then displays a second image at a second driving frequency higher than the first driving frequency according to the present disclosure.

FIG. 8 illustrates the display device 100 according to aspects that displays a first image at a first driving frequency and then displays a second image at a second driving frequency higher than the first driving frequency.

Referring to FIG. 8, the display device 100 according to aspects outputs the first image Image A at the first driving frequency. In addition, at a point in time at which the image displayed by the display device 100 is converted from the first image Image A to the second image Image B, the display device 100 outputs the second image Image B at the second driving frequency.

Referring to FIG. 8, the second driving frequency is higher than the first driving frequency. For example, when the first driving frequency is 1 Hz, the second driving frequency may be about 30 Hz or higher.

Referring to FIG. 8, the first driving frequency matches a low refresh frame rate (LRR). In addition, the second driving frequency matches a middle refresh frame rate (MRR). That is, herein, the refresh frame rate has the same meaning as the driving frequency.

Meanwhile, the value of the second driving frequency may be a divisor value of the maximum driving frequency of the display device 100 according to aspects.

For example, when the value of the maximum driving frequency of the display device 100 according to aspects is 120 Hz, the value of the second driving frequency may be one of 1, 2, 3, 4, 5, 6, 8, 10, 12, 15, 20, 24, 30, 40, 60, and 120 Hz.

The value of the second driving frequency may be selected from frequencies at which the response time delay is not visually recognized by the user.

As described above, the value of the second driving frequency may be set differently depending on the difference in the grayscale between the first image and the second image.

In some cases, the value of the second driving frequency may be selected on the premise of a black-to-white situation in which the response time delay is easily visible due to the greatest difference in the grayscale between the first image and the second image.

Herein, for the sake of brevity, the value of the second driving frequency will be described as being set irrespective of the difference in the grayscale between the first image and the second image, but the present disclosure is not limited thereto.

Meanwhile, the value of the second driving frequency may be selected differently depending on the value of the first driving frequency. In some cases, the second driving frequency may have a fixed value selected irrespective of the value of the first driving frequency.

The value of the second driving frequency may be selected in consideration of human cognitive characteristics. For example, it is known that an image observed by the human eye persists for about 1/16 second as an afterimage.

Thus, when a time for conversion from the first image Image A to the second image Image B is equal to or longer than 1/16 second, a person may recognize that images change continuously. Consequently, the value of the second driving frequency may be, for example, 20 Hz or higher.

In addition, referring to the above-description in conjunction with FIGS. 7A and 7B, when the second image Image B is a white grayscale image, it may be required to output two or three refresh frames until the image is converted from the first image Image A to the second image Image B.

Thus, more particularly, the value of the second driving frequency may be set to be 30 Hz or higher so that a 2-frame period is about 1/16 second or shorter.

Referring to FIG. 8, the length (t sec) of a middle refresh frame rate (MRR) period may vary depending on the value of the second driving frequency.

For example, when the second driving frequency is higher, the length of the time for conversion from the first image Image A to the second image Image B may be shorter. In addition, when the second driving frequency is lower, the length of the time for conversion from the first image Image A to the second image Image B may be longer.

Meanwhile, the display device 100 according to aspects outputs the second image Image B at the first driving frequency in a period after having output the second image Image B at the second driving frequency.

That is, the display device 100 according to aspects outputs the first image Image A at the first driving frequency, outputs the second image Image B converted from the first image Image A at the second driving frequency, and then the second image Image B at the first driving frequency.

Thus, when there is no change in the image that the display device 100 outputs, the image is output at the first driving frequency that is a significantly low driving frequency (e.g., 1 Hz), and when the image is converted, outputs the converted image at the second frequency (e.g., 30 Hz). In addition, the display device may output the converted image again at the first driving frequency.

Consequently, the display device 100 according to aspects can overcome the problem of the response time delay and significantly reduce power consumption.

Figure 9:
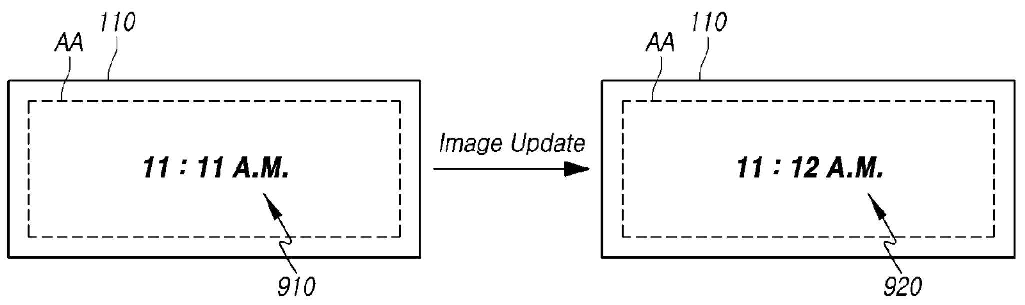
FIG. 9 illustrates an example of a low power mode in which the display device may operate according to the present disclosure.

FIG. 9 illustrates an example of a low power mode in which the display device 100 according to aspects may operate.

Referring to FIG. 9, the display device 100 according to aspects may operate in a low power mode. The low power mode may be, for example, an AoD mode.

While the display device 100 is operating in the AoD mode, time information or the like may be displayed in the active area AA. The time information displayed in the active area AA is persistently updated according to the passage of time (e.g., updated from 11:11 A.M. to 11:12 A.M.).

For example, referring to FIG. 9, an image that the display device 100 displays in the active area AA is converted from a first image 910 to a second image 920.

The display device 100 according to aspects outputs the first image 910 at the first driving frequency.

When the image displayed in the active area AA is converted from the first image 910 to the second image 920, the display device 100 according to aspects outputs the second image 920 at the second driving frequency higher than the first driving frequency.

The display device 100 according to aspects outputs the second image 920 at the second driving frequency for a preset period, and then outputs the second image 920 at the first driving frequency.

Figure 10A:
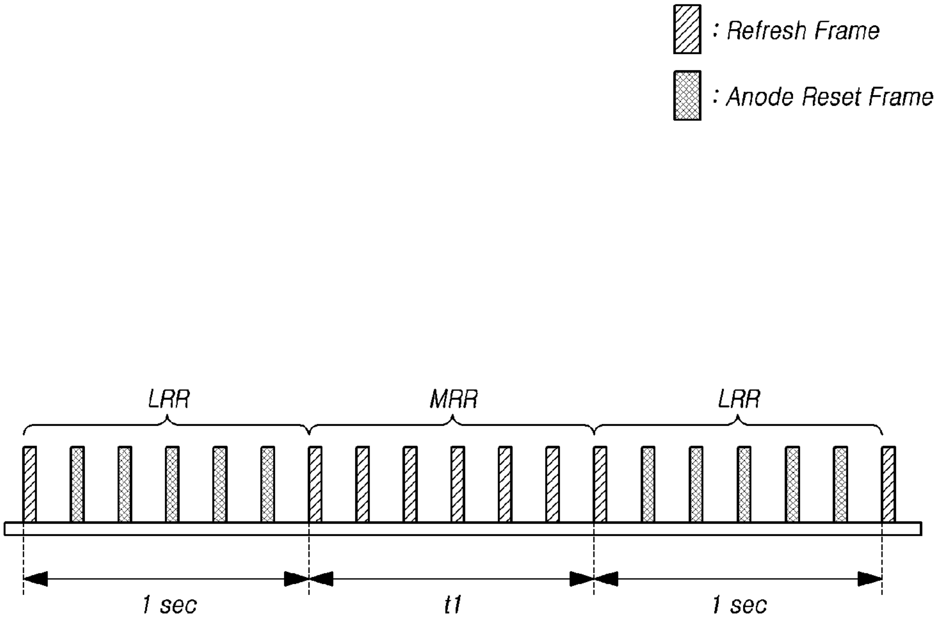
FIGS. 10A to 10C illustrate a situation in which the second driving frequency of the display device changes according to the first driving frequency or a period in which the display device operates in the second driving frequency changes according to the first driving frequency according to the present disclosure.
Figure 10B:
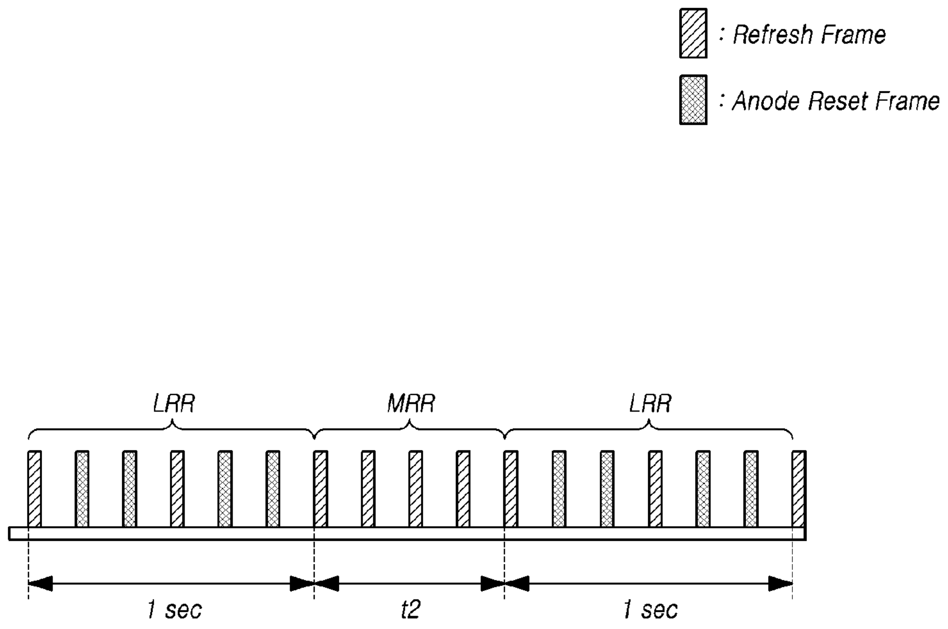
Figure 10C:
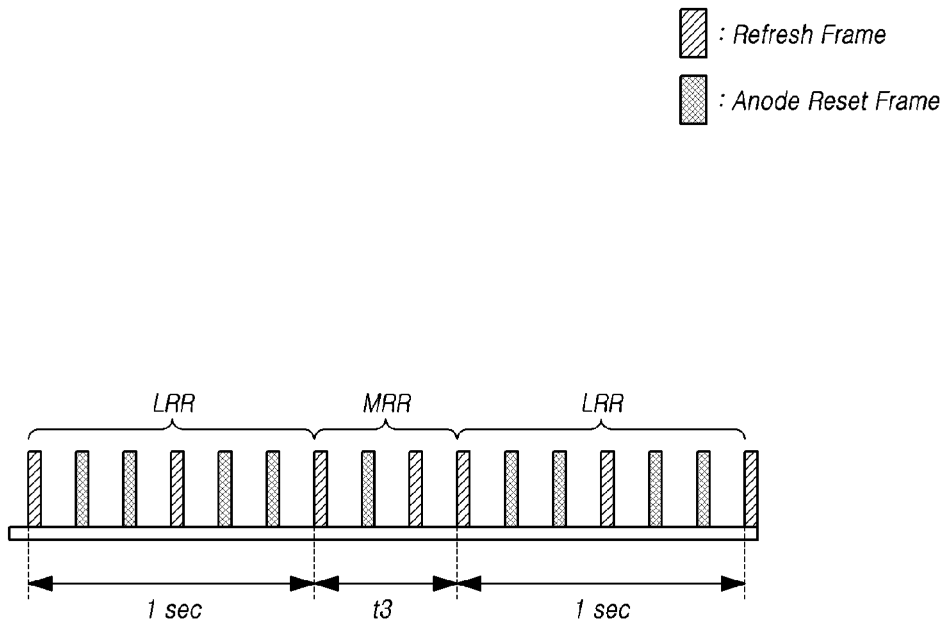

FIGS. 10A to 10C illustrate a situation in which the second driving frequency of the display device 100 according to aspects changes according to the first driving frequency or a period in which the display device 100 according to aspects operates in the second driving frequency changes according to the first driving frequency.

Referring to FIG. 10A, the display device 100 according to aspects displays images at the first driving frequency during low refresh frame rate (LRR) periods. The display device 100 also displays images at the second driving frequency during middle refresh frame rate (MRR) periods.

Referring to FIG. 10A, an aspect in which the display device 100 consecutively displays 5 anode reset frames after having displayed a single refresh frame in the LRR periods is illustrated.

Referring to FIG. 10A, an aspect in which the display device 100 only displays refresh frames in the MRR periods is illustrated.

Thus, when the first driving frequency of each of the LRR periods is 10 Hz, the second driving frequency of each of the MRR periods may be 60 Hz.

Referring to FIG. 10B, an aspect in which the display device 100 consecutively displays 2 anode reset frames after having displayed a single refresh frame in each of the LRR periods is illustrated.

Referring to FIG. 10B, an aspect in which the display device 100 only displays refresh frames in each of the MRR periods is illustrated.

Thus, when the first driving frequency of each of the LRR periods is 20 Hz, the second driving frequency of each of the MRR periods may be 60 Hz.

Referring to FIGS. 10A and 10B, when the first driving frequency is increased and the second driving frequency is constant, the difference between the first driving frequency and the second driving frequency is reduced. Thus, when the first driving frequency is increased and the second driving frequency is constant, the difference in the value between the first driving frequency and the second driving frequency is reduced. Thus, the degree to which an afterimage of the image displayed in each of the LRR periods is visually recognized may be relatively reduced.

Referring to FIGS. 10A and 10B, when the first driving frequency is increased, the length of each of the MRR periods may be reduced. For example, referring to FIGS. 10A and 10B, the length of each of the MRR periods may be reduced from t1 to t2.

Referring to FIG. 10B, as the length of each of the MRR periods is reduced, the length of each of the LRR periods may be increased compared to a case in which the length of each of the MRR periods is constant. Thus, it may be advantageous to reduce power consumption.

Referring to FIG. 10C, an aspect in which 2 anode reset frames are displayed consecutively after the display device 100 displays a single refresh frame in each of the LRR periods is illustrated.

Referring to FIG. 10C, an aspect in which the display device 100 displays a single anode reset frame after having displayed a single refresh frame in each of the MRR periods is illustrated.

Thus, when the first driving frequency of each of the LRR periods is 20 Hz, the second driving frequency of each of the MRR periods may be 30 Hz.

Referring to FIGS. 10A and 10C, when the magnitude of the first driving frequency is increased, the magnitude of the second driving frequency may be reduced. The magnitude of the second driving frequency may be reduced since the degree to which an afterimage is visually recognized may be reduced with increases in the magnitude of the first driving frequency. Here, also in this case, the magnitude of the second driving frequency may be greater than the magnitude of the first driving frequency.

Figure 11:
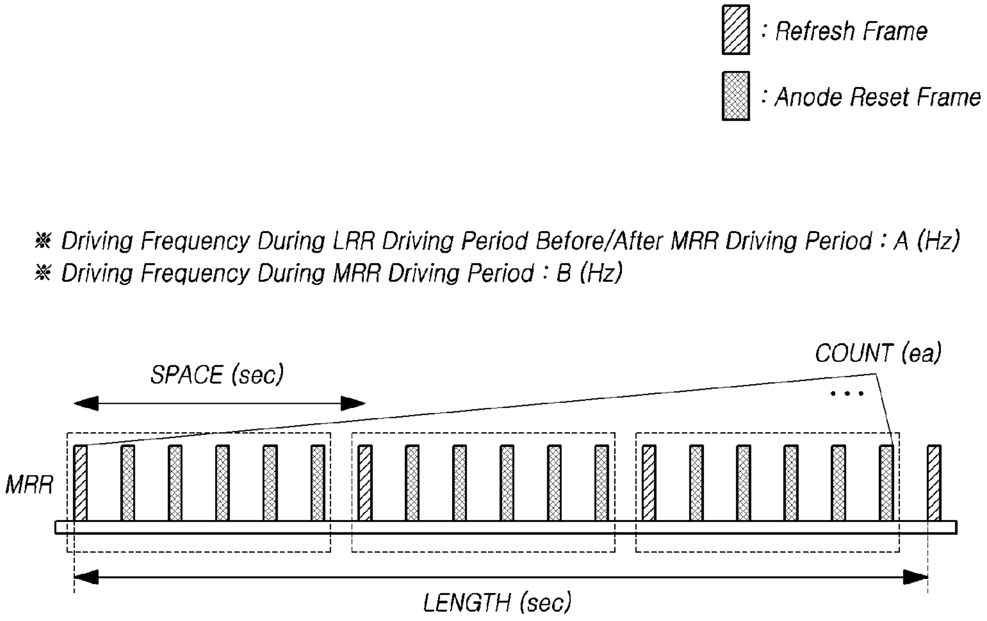
FIG. 11 illustrates an example of a method of setting the length of each of the middle refresh frame periods by the display device according to the present disclosure.

FIG. 11 illustrates an example of a method of setting the length of each of the MRR periods by the display device 100 according to aspects.

Referring to FIG. 11, the first driving frequency of each of the LRR periods may be used as a parameter for setting the length of each of the MRR periods.

Here, each of the LRR periods refers to an LRR period before (or immediately before) or after (or immediately after) each of the MRR periods.

The first driving frequency of each of the LRR periods may be A Hz.

The first driving frequency may be a driving frequency during a period in which the display device 100 operates in the low power mode. The first driving frequency may be a driving frequency (e.g., 16 Hz) at which an afterimage may be visually recognized due to human cognitive characteristics.

The length LENGTH of each of the MRR periods may be set by the following Equation 1.

$$\text{LENGTH}=3\times(1/A)(\text{sec}) \quad \text{[Equation 1]}$$

Equation 1 reflects that, the lower the value of the first driving frequency, the longer the length LENGTH of each of the MRR periods may be.

For example, when the first driving frequency is 1 Hz, the value of A is 1. Here, the length LENGTH of each of the MRR periods may be 3 seconds.

In Equation 1, setting the coefficient of the right term to be 3 is only an example, and the present disclosure is not limited thereto.

Here, the second driving frequency of each of the MRR periods may be B Hz.

The second driving frequency of the MRR may be a value higher than the first driving frequency. The second driving frequency may be set as a value the same as or smaller than the highest driving frequency (e.g., 120 Hz) that the display device 100 may realize.

In each of the MRR periods, the cycle SPACE of the second driving frequency is the reciprocal of the second driving frequency, as expressed below by the following Equation 2.

$$\text{SPACE}=1/B(\text{sec}) \quad \text{[Equation 2]}$$

For example, when the second driving frequency in each of the MRR periods is 30 Hz, the cycle SPACE of the second driving frequency is 0.033 second.

As described above, the cycle SPACE of the second driving frequency may be selected in consideration of human cognitive characteristics.

For example, the cycle SPACE of the second driving frequency may be selected to have a value shorter than 1/16 so that an afterimage is not visually recognizable.

Referring to FIG. 11, the number COUNT of refresh frames output in each of the MRR periods may be deduced by the following Equation 3.

$$COUNT=LENGTH\times B \quad \text{[Equation 3]}$$

The number COUNT of refresh frames output in each of the MRR periods may be selected to be 2 or more.

When the length of each of the LRR periods is 3 seconds and the value B of the second driving frequency is 30, the number COUNT of refresh frames output in each of the MRR periods may be 90.

Hereinafter, an example of the display device 100 according to aspects will be described with reference to FIGS. 9 and 11.

Referring to FIG. 9, the display device 100 according to aspects may display time information in the low power mode. The time information may be expressed in units of minutes.

For example, the display device 100 according to aspects may express the first image 910 at a first driving frequency of 1 Hz.

At a point in time at which the image displayed by the display device 100 is converted from the first image 910 to the second image 920, the display device 100 may display the second image 920 at a second driving frequency of 30 Hz.

The display device 100 according to aspects may output the second image 920 for the period of the value calculated in Equation 1. The display device 100 according to aspects may output the second image 920 the number of times calculated in Equation 3.

Thus, the display device 100 may output the second image 920 90 times for 3 seconds.

The display device 100 according to aspects outputs the second image 920 by the number of times calculated by Equation 3 during the period calculated in Equation 1, and then outputs the second image 920 at the first driving frequency.

In this manner, the display device 100 may output the second image 920 during the period of the remaining 57 seconds.

In addition, when the second image 920 is converted to a new image different from the second image 920, the display device 100 may output the new image by the above-described process.

Thus, the display device 100 according to aspects may display images at a significantly low driving frequency (e.g., 1 Hz or 10 Hz). The display device 100 according to aspects may operate at a driving frequency at which an afterimage may persist so as to be observed by the human eye during the LRR periods.

Figure 12:
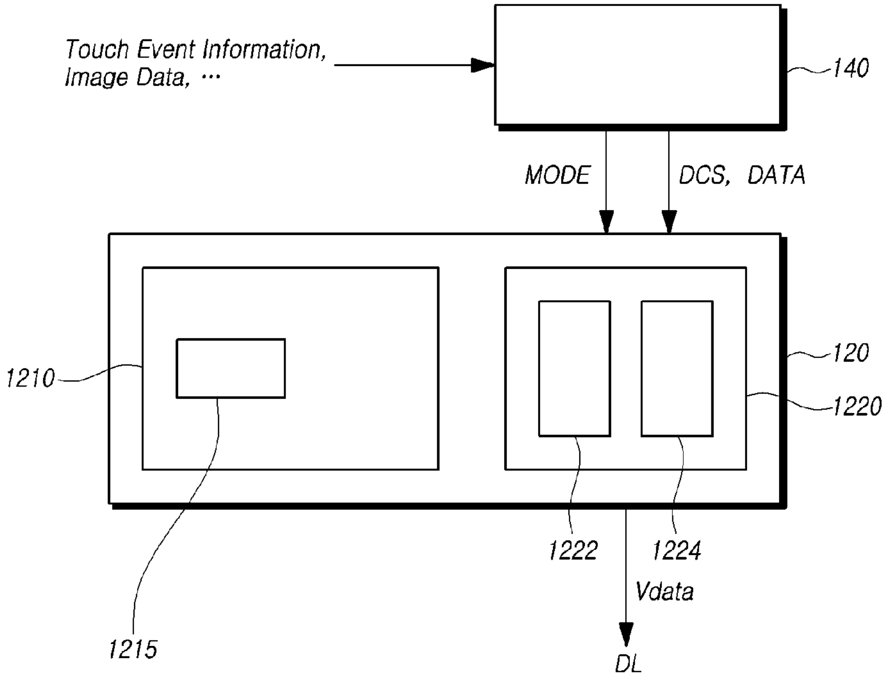
FIG. 12 illustrates an example of a data driver circuit according to the present disclosure.

FIG. 12 illustrates a data driver circuit according to aspects.

Referring to FIG. 12, the data driver circuit 120 according to aspects may include an output circuit 1220.

The data driver circuit 120 according to aspects may include image data input pins through which image data DATA are received and pins through which data drive timing control signals DCS are input. The controller 140 may receive image data from an external source, convert the image data according to a data signal format readable by the data driver circuit 120, and provide the converted image data DATA to the data driver circuit 120.

In addition, the controller 140 may output a mode control signal MODE to drive the data driver circuit 120 in a normal mode or a low power mode. The data driver circuit 120 may operate at a preset refresh frame rate in response to the mode control signal MODE. That is, the controller 140 may output the mode control signal MODE by which a period in which the data driver circuit 120 applies image-displaying data voltages Vdata to the plurality of data lines DL is adjusted.

During the period in which the data driver circuit 120 operates in the low power mode, the operation period of the output circuit 1220 may change.

The output circuit 1220 includes a first output circuit 1222 to generate data voltages Vdata on the basis of grayscale values of the image data DATA and the like. While the data driver circuit 120 is operating in the low power mode, the operation period of the first output circuit 1222 may be increased to be longer than a period in which the data driver circuit 120 operates in the normal mode.

The first output circuit 1222 may be a circuit generating data voltages Vdata on the basis of the image data DATA and the data drive timing control signals DCS. The first output circuit 1222 may include at least one shift register, at least one latch circuit, and at least one digital-to-analog converter.

Voltages generated by the first output circuit 1222 may be applied to the plurality of data lines DL in the refresh frame period.

Meanwhile, the output circuit 1220 may further include a second output circuit 1224 to generate voltages applied to the plurality of data lines DL during a skip frame period different from the refresh frame period.

The second output circuit 1224 may output voltages in blank periods.

Referring to FIG. 4 described above, the second output circuit 1224 may be a circuit generating a park voltage Vpark having a preset level. The second output circuit 1224 may include a voltage stabilizer circuit configured to uniformly output voltages having a constant level.

The second output circuit 1224 does not generate data voltages Vdata having different levels according to grayscale information of the image data DATA. In the same reason, the amount of power consumed by the data driver circuit 120 during the period in which the second output circuit 1224 is driven is smaller than the amount of power consumed by the data driver circuit 120 during the period in which the first output circuit 1222 is driven.

Thus, the shorter the driving period of the first output circuit 1222, the greater the amount of power consumed by the data driver circuit 120 may be. In contrast, the longer the driving period of the first output circuit 1222, the smaller the amount of power consumed by the data driver circuit 120 may be.

As described above, the controller 140 may output the mode control signal MODE by which the data driver circuit 120 is controlled to operate at a low refresh frame rate (LRR).

Meanwhile, the data driver circuit 120 may further include a sub-controller 1210.

The sub-controller 1210 receives the image data DATA input through the image data input pins, and determines whether or not the image data DATA) is converted from a first image to a second image.

The sub-controller 1210 may control the output circuit 1220. Specifically, the sub-controller 1210 may control the output circuit 1220 so that the data driver circuit 120 operating at the low refresh frame rate (LRR) operates at the middle refresh frame rate (MRR).

The sub-controller 1210 may control the output circuit 1220 to operate at the middle refresh frame rate in the period in which the data driver circuit 120 receives the mode control signal MODE by which the data driver circuit 120 is controlled to operate at the low refresh frame rate.

That is, the data driver circuit receives the image data DATA) for outputting the second image from the controller 140 during the period in which data voltages Vdata for outputting the first image are output to the plurality of data lines DL at the first driving frequency.

In addition, the data driver circuit 120 may output data voltages Vdata for outputting the second image to the plurality of data lines DL in the first refresh frame in which data voltages Vdata for outputting the second image are output at the second driving frequency.

The following description will be given with reference to FIG. 12.

In the period in which the output circuit 1220 operates at the low refresh frame rate, the first frequency may be 10 Hz.

When the image data DATA input through the image data input pins is converted from the first image to the second image, the sub-controller 1210 may control the output circuit 1220 to operate at the middle refresh frame rate.

In the period in which the output circuit 1220 operates at the middle refresh frame rate, the second frequency may be 60 Hz.

Meanwhile, in the period in which the output circuit 1220 operates at the low refresh frame rate, the first frequency may be 1 Hz.

When the image data DATA input through the image data input pins is converted from the first image to the second image, the sub-controller 1210 may control the output circuit 1220 to operate at the middle refresh frame rate.

In the period in which the output circuit 1220 operates at the middle refresh frame rate, the second frequency may be 120 Hz.

The sub-controller 1210 may include a plurality of sets SET to control the output circuit 1220 so that the output circuit 1220 operates at a preset driving frequency.

Each of the plurality of sets SET may output a signal to operate (or drive) the output circuit 1220 at a preset driving frequency.

The sub-controller 1210 may select one set among the plurality of sets SET on the basis of the mode control signal MODE input from the controller 140.

For example, referring to FIG. 12, the sub-controller 1210 may select the third set Set 3 on the basis of the mode control signal MODE. In this case, the sub-controller 1210 may control the output circuit 1220 to operate at a driving frequency of 10 Hz.

In addition, the sub-controller 1210 may include a memory 1215 in which a lookup table LUT is stored.

In the lookup table LUT, information regarding refresh frame rates (also referred to as refresh rates) corresponding to the sets SET, respectively, is stored.

Meanwhile, the lookup table LUT contains information regarding at what driving frequency the data driver circuit 120 is to operate when the image input to the data driver circuit 120 is converted from the first image to the second image.

For example, referring to FIG. 12, the lookup table LUT may contain information describing that, in the period in which the output circuit 1220 operates at a low refresh frame rate of 10 Hz, when the image input to the data driver circuit 120 is converted from the first image to the second image, the output circuit 1220 outputs the second image at a driving frequency of 60 Hz.

The lookup table LUT may contain information calculated on the basis of Equations 1 to 3 described above in conjunction with FIG. 11.

Thus, the sub-controller 1210 may drive the output circuit 1220 at a preset driving frequency by referring to the mode control signal MODE and the lookup table LUT stored in memory 1215. When the image data DATA is converted from the first image to the second image, the sub-controller 1210 may change the driving frequency of the output circuit 1220 by selecting one set among the plurality of sets SET with reference to the lookup table LUT.

Thus, even in the case in which the image output from the controller 140 is converted from the first image to the second image, the controller 140 may consecutively output the mode control signal MODE to control the data driver circuit 120 to operate at the low refresh frame rate.

Consequently, the controller 140 may continuously drive the display device 100 in the low power mode.

Meanwhile, the display device 100 according to aspects may be a touch display device providing a touch sensing function. Thus, the display device 100 may further include a touch sensing circuit to detect at least one of a touch and touch coordinates. When a touch is detected, the touch sensing circuit may output touch event information to the controller 140.

When the touch event information is input in the period in which the controller 140 operates the display device 100 in the low power mode, the controller 140 switches the operation state of the display device 100 from the low power mode to the normal mode.

When the touch event information is input to the controller 140 in the period in which the data driver circuit 120 operates at the middle refresh frame rate, the mode control signal MODE is input to the data driver circuit 120 to control the data driver circuit 120 to operate in the normal mode.

In this case, the operation of the sub-controller 1210 controlling the output circuit 1220 to operate at the middle refresh frame rate is stopped. In addition, the sub-controller 1210 may control the output circuit 1220 to operate at a preset frequency (e.g., 120 Hz) on the basis of the mode control signal MODE.

Figure 13:
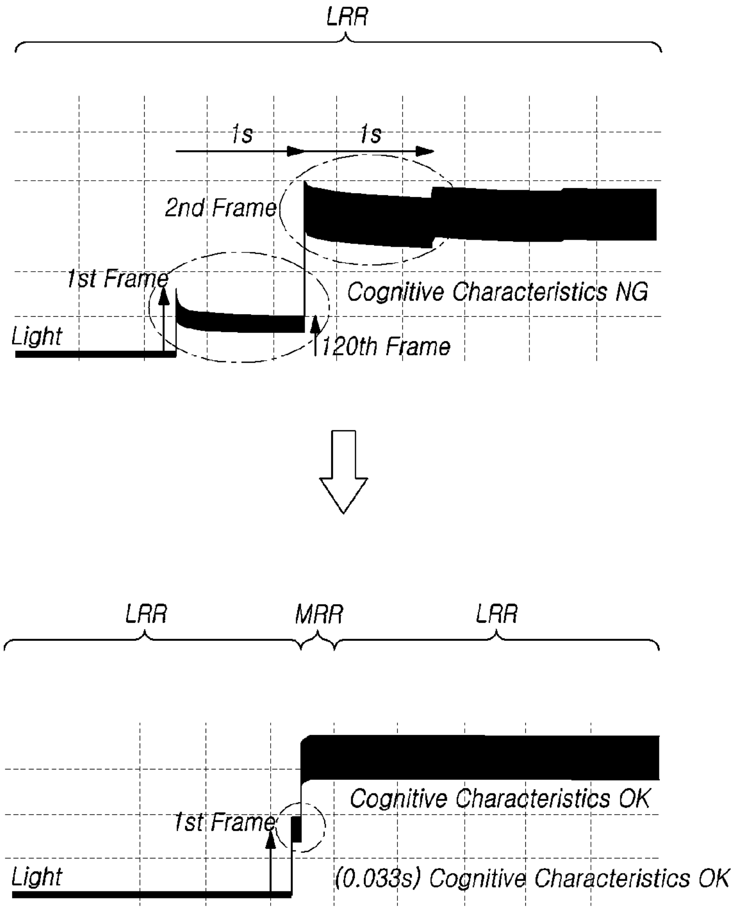
FIG. 13 illustrates a situation in which the display device displays images at a low refresh frame rate according to the present disclosure.

FIG. 13 illustrates a situation in which the display device 100 according to aspects displays images at a low refresh frame rate.

Referring to FIG. 13, the display device 100 according to aspects may output images at the first driving frequency during the LRR period.

Referring to FIG. 13, the display device 100 according to aspects may output a first image at the first driving frequency and a second image at the first driving frequency. Here, the first driving frequency may be 1 Hz.

When there is a significant difference in the grayscale between the first image and the second image, an afterimage may be visually recognized by the user of the display device 100 in a period in which the first image is converted to the second image.

When the first driving frequency is 1 Hz, the afterimage may be visually recognized for about 2 seconds.

The display device 100 according to aspects may output the first image at the first driving frequency and, at a point at time at which the first image is converted to the second image, output the second image at second driving frequency during the MRR period.

The second driving frequency may be selected in consideration of human cognitive characteristics. The second driving frequency may be, for example, 30 Hz.

Referring to FIG. 13, when the second driving frequency is 30 Hz, the response time may be delayed by only about 1/30 second (i.e., about 0.033 second).

Since the delay of the response time is shorter than a time length (i.e., about 1/16 second) in which an afterimage may be visually recognized by a person, the user of the display device 100 recognized that the first image is continuously converted to the second image. Thus, no afterimage is visually recognized by the user of the display device 100.

The display device 100 according to aspects outputs the second image at the second driving frequency during a preset MRR period. The MRR period may be previously set as described above in conjunction with FIG. 11.

The display device 100 according to aspects displays the second image at the second driving frequency during the MRR period, and then outputs the second image at the first driving frequency during the LRR period.

In this manner, the display device 100 according to aspects may reduce the occurrence of visually-recognizable afterimages while displaying images at the low refresh frame rate. Accordingly, the display quality may be improved, and the power efficiency of the display device 100 may be significantly improved.

Figure 14:
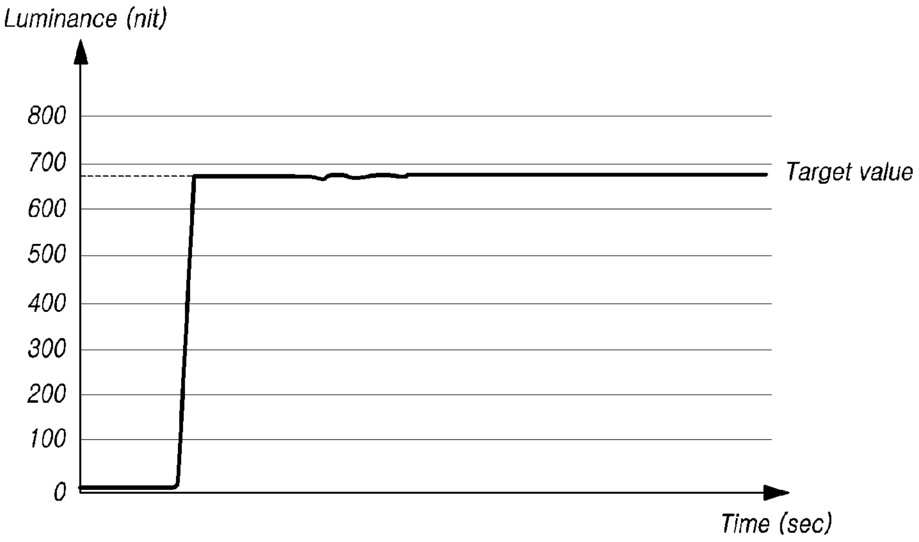
FIG. 14 is a time-luminance graph in a situation in which the display device displays a first image having a black grayscale and then a second image having a white grayscale in a low power mode according to the present disclosure.

FIG. 14 is a time-luminance graph in a situation in which the display device 100 according to aspects displays a first image having a black grayscale and then a second image having a white grayscale in a low power mode.

Referring to FIG. 14, when the display device 100 according to aspects displays the first image having a black grayscale and then the second image having a white grayscale in the low power mode, the display device 100 can prevent an afterimage of the first image from being visually recognized. That is, even in the case in which there is a significant difference in the grayscale between the first image and the second image, the display device 100 according to aspects can prevent an afterimage of the first image from being visually recognized.

The aspects of the present disclosure set forth above will be briefly described as follows.

According to aspects, the display device 100 may include: a display panel 110 including a plurality of subpixels SP and a plurality of data lines DL electrically connected to the plurality of subpixels SP; and a data driver circuit 120 configured to apply data voltages Vdata for outputting images to the plurality of data lines DL in a refresh frame period. The data driver circuit 120 may apply a data voltage Vdata for outputting a first image (e.g., 910) to the plurality of data lines DL at a first driving frequency; and apply a data voltage Vdata for outputting a second image (e.g., 920) different from the first image to the plurality of data lines DL at a second driving frequency higher than the first driving frequency.

According to aspects, the data driver circuit 120 may apply a data voltage Vdata for outputting the second image to the plurality of data lines DL at the first driving frequency after having applied the data voltage Vdata for outputting the second image to the plurality of data lines DL at the second driving frequency.

According to aspects, the data driver circuit 120 may apply a data voltage Vdata having a predetermined level to the plurality of data lines DL in a skip frame period different from the refresh frame period.

According to aspects, the data driver circuit 120 may apply the data voltage Vdata for outputting the first image to the plurality of data lines DL at the first driving frequency during a first period (e.g., an LRR period); apply the data voltage Vdata for outputting the second image different from the first image to the plurality of data lines DL at the second driving frequency higher than the first driving frequency during a second period (e.g., an MRR period) after the first period; and apply the data voltage Vdata for outputting the second image at the first driving frequency during a third period (e.g., an LRR period) after the second period.

According to aspects, the data driver circuit 120 may apply the data voltage Vdata for outputting the second image to the plurality of data lines DL in a first refresh frame in which the data voltage Vdata for outputting the second image is output at the second driving frequency.

According to aspects, the display device 100 may further include a controller 140 configured to output image data DATA for outputting the first image and image data DATA for outputting the second image to the data driver circuit 120.

According to aspects, the data driver circuit 120 may receive the image data DATA for outputting the second image in a period in which the data voltage Vdata for outputting the first image is output to the plurality of data lines DL at the first driving frequency.

According to aspects, the controller 140 may output a mode control signal to adjust a cycle in which the data driver circuit 120 applies the data voltage Vdata for outputting images to the plurality of data lines DL.

According to aspects, the data driver circuit 120 may include: an output circuit 1220 configured to generate and output the data voltage Vdata; and a sub-controller 1210 configured to convert a driving frequency of the output circuit 1220 from the first driving frequency to the second driving frequency by controlling the output circuit 1220.

According to aspects, the sub-controller 1210 may determine whether or not the image data DATA input to the data driver circuit 120 is converted to the image data DATA for outputting the second image, and convert the first driving frequency to the second driving frequency on the basis of a result of the determination.

According to aspects, the output circuit 1220 may include: a first output circuit 1222 configured to generate and output the data voltage Vdata for outputting images; and a second output circuit 1224 configured to generate and output a data voltage Vdata having a predetermined level. The data voltage Vdata having the predetermined level may be applied to the plurality of data lines DL in a skip frame period instead of the refresh frame period.

According to aspects, the sub-controller 1210 may include a memory 1215 storing a lookup table LUT. The lookup table LUT contains information regarding a value A of the first driving frequency and a value B of the second driving frequency with respect to the value of the first driving frequency.

According to aspects, the sub-controller 1210 may include one or more sets SET to output a signal to drive the output circuit 1220 at a predetermined driving frequency.

According to aspects, the second driving frequency may be set differently according to the value of the first driving frequency.

According to aspects, the length of the period in which the operation is performed at the second driving frequency may be set differently according to the value of the first driving frequency.

According to aspects, at least one of the value of the second driving frequency and the length of the period in which the operation is performed at the second driving frequency may be set differently according to the value of the first driving frequency.

According to aspects, the first driving frequency may be a reciprocal to a value of a time interval between two refresh frame periods consecutive to the first period. The second driving frequency may be a reciprocal to a value of a time interval between two refresh frame periods consecutive to the second period.

According to aspects, the second driving frequency may be 30 Hz or higher.

According to aspects, in a period in which the display device 100 operates in a low power mode, the data driver circuit 120 may apply the data voltage Vdata for outputting the first image to the plurality of data lines DL at the first driving frequency, and apply the data voltage Vdata for outputting the second image to the plurality of data lines DL at the second driving frequency.

According to aspects, a data driver circuit 120 may include: image data input pins through which image data DATA is input; a first output circuit 1222 configured to generate and output data voltage Vdata for outputting images on the basis of the image data DATA input through the image data input pins; a mode control signal input pin configured to receive a mode control signal for changing an operation cycle of the first output circuit 1222; and a sub-controller 1210 configured to reduce the operation cycle of the first output circuit 1222 on basis of the image data DATA input through the image data input pins.

According to aspects, the data driver circuit 120 may further include a mode control signal input pin through which a mode control signal for changing an operation cycle of the first output circuit 1222 is input. The first output circuit 1222 may operate in a low power mode in which an operation period is relatively long or in a normal mode in which an operation period is relatively short in response to the mode control signal.

According to aspects, wherein the sub-controller 1210 may reduce the operation period of the first output circuit 1220 when different image data DATA is input through the image data input pins during a period in which the mode control signal for controlling the first output circuit 1220 to operate in the low power mode is input.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:
- a display panel including a plurality of subpixels and a plurality of data lines electrically connected to the plurality of subpixels; and
- a data driver circuit configured to apply a data voltage to the plurality of data lines during at least one refresh frame period,
- wherein the display device is configured to operate in at least one of a normal mode and a low power mode in which at least one anode reset frame period is configured in a display frame,
- wherein, in the low power mode, the data driver circuit is configured to apply the data voltage for outputting a first image to the plurality of data lines at a first driving frequency during a first period, configured to apply the data voltage for outputting a second image different from the first image to the plurality of data lines at a second driving frequency higher than the first driving frequency during a second period following the first period, and configured to apply the data voltage for outputting the second image to the plurality of data lines at the first driving frequency during a third period following the second period, and
- wherein the at least one anode reset frame period at which a data voltage having a predetermined level is supplied to the plurality of data lines is present in each of the first, second and third periods and a number of anode reset frame periods configured between two adjacent refresh frame periods included in each of the first and third periods is greater than a number of anode reset frame periods configured between two adjacent refresh frames included in the second period.

2. The display device of claim 1, wherein the data voltage having the predetermined level supplied to the plurality of data lines in each of the first, second, and third frame periods is supplied by the data driver circuit.

3. The display device of claim 1, wherein the data driver circuit is configured to apply the data voltage for outputting the second image to the plurality of data lines in a first refresh frame in which the data voltage for outputting the second image is output at the second driving frequency.

4. The display device of claim 1, further comprising a controller configured to output image data for outputting the first image and image data for outputting the second image to the data driver circuit.

5. The display device of claim 4, wherein the data driver circuit is configured to receive the image data for outputting the second image in a period in which the data voltage for outputting the first image is output to the plurality of data lines at the first driving frequency.

6. The display device of claim 4, wherein the controller is configured to output a mode control signal to adjust a cycle in which the data driver circuit applies the data voltages for outputting images to the plurality of data lines.

7. The display device of claim 6, wherein the data driver circuit comprises:
- an output circuit configured to generate and output the data voltages; and
- a sub-controller configured to convert a driving frequency of the output circuit from the first driving frequency to the second driving frequency by controlling the output circuit.

8. The display device of claim 7, wherein the sub-controller is configured to:

determine whether or not the image data input to the data driver circuit is converted to the image data for outputting the second image; and convert the first driving frequency to the second driving frequency on basis of a result of the determination.

9. The display device of claim 7, wherein the output circuit comprises:

a first output circuit configured to generate and output the data voltages for outputting images; and a second output circuit configured to generate and output a data voltage having the predetermined level.

10. The display device of claim 7, wherein the sub-controller comprises a memory storing a lookup table, and wherein the lookup table contains information regarding a value of the first driving frequency and a value of the second driving frequency with respect to the value of the first driving frequency.

11. The display device of claim 7, wherein the sub-controller comprises one or more sets to output a signal to drive the output circuit at a predetermined driving frequency.

12. The display device of claim 1, wherein at least one of a value of the second driving frequency and a length of a period in which operation is performed at the second driving frequency is set differently according to a value of the first driving frequency.

13. The display device of claim 1, wherein the first driving frequency is a reciprocal to a value of a time interval between two refresh frame periods consecutive to a first period, and wherein the second driving frequency is a reciprocal to a value of a time interval between two refresh frame periods consecutive to a second period.

14. The display device of claim 1, wherein the second driving frequency is 30 Hz or higher.

15. A data driver circuit comprising:

image data input pins configured to receive image data;

a first output circuit configured to generate and output data voltages for outputting images on basis of the image data input through the image data input pins;

a mode control signal input pin configured to receive a mode control signal for changing an operation cycle of the first output circuit; and a sub-controller configured to reduce the operation cycle of the first output circuit on basis of the image data input through the image data input pins, wherein the data driver circuit is configured to apply a data voltage to a plurality of data lines in during at least one refresh frame period, wherein the first output circuit is configured to operate in a normal mode, or in a low power mode in which at least one anode reset frame period is configured in a display frame, wherein, in the low power mode, the data driver circuit is configured to apply the data voltage for outputting a first image to the plurality of data lines at a first driving frequency during a first period, configured to apply the data voltage for outputting a second image different from the first image to the plurality of data lines at a second driving frequency higher than the first driving frequency during a second period following the first period, and configured to apply the data voltage for outputting the second image to the plurality of data lines at the first driving frequency during a third period following the second period, and wherein the at least one anode reset frame period at which a data voltage having a predetermined level is supplied to the plurality of data lines is present, in each of the first, second, and third periods and a number of anode reset frame periods configured between two adjacent refresh frame periods included in each of the first and third periods is greater than a number of anode reset frame periods configured between two adjacent refresh frames included in the second period.

16. The data driver circuit of claim 15, wherein an operation period in the low power mode is relatively long and an operation period in the normal mode is relatively short.

17. The data driver circuit of claim 16, wherein the sub-controller is configured to reduce the operation period of the first output circuit when different image data is input through the image data input pins during a period in which the mode control signal for controlling the first output circuit to operate in the low power mode is input.

* * * * *